United States Patent [19]
Wickman

[11] Patent Number: 6,047,177
[45] Date of Patent: Apr. 4, 2000

[54] METHOD, DEVICE, AND SYSTEM FOR RADIO COMMUNICATION AT SHORT DISTANCES

[75] Inventor: Johan Wickman, Bjarred, Sweden

[73] Assignee: Telia AB, Farsta, Sweden

[21] Appl. No.: 08/787,173

[22] Filed: Jan. 23, 1997

[30] Foreign Application Priority Data

Jan. 26, 1996 [SE] Sweden .................................. 9600345

[51] Int. Cl.[7] ................................................... H04Q 7/00
[52] U.S. Cl. .......................... 455/422; 455/426; 455/450
[58] Field of Search ................................... 455/422, 426, 455/458, 446, 450, 452, 451, 454, 455, 550, 552, 562, 62, 461, 462, 466; 348/6, 7, 13

[56] References Cited

U.S. PATENT DOCUMENTS 5,212,684  5/1993  MacNamee et al. .................... 455/426
5,774,805  6/1998  Zicker .................................... 455/426

*Primary Examiner*—Thanh Cong Le
*Attorney, Agent, or Firm*—Oblon, Spivak, McClelland, Maier & Neustadt, P.C.

[57] ABSTRACT

A method, device and system for radio based short range communication makes possible local network access for capacity-demanding broadband services in a cellular short range system such as DECT. Two separate cellular systems for short range communication are integrated to make a hybrid system, where one of the systems is a DECT system and the other system is a LMDS system. The integration combines DECT and LMDS so that LMDS is used for radio transmission between a DECT-PP and a DECT-RFP via an uplink and a downlink, and for transmission of broadband information in a downlink. The DECT aspect is used for speech, narrow band and medium band data communication, and for transmission of authorization/encryption information so that only authorized subscriber can utilize the information which is transmitted via DECT and LMDS.

20 Claims, 6 Drawing Sheets

METHOD, DEVICE, AND SYSTEM FOR RADIO COMMUNICATION AT SHORT DISTANCES

BACKGROUND OF THE INVENTION

1. Field of the Invention

The present invention relates to a device, a method and radio-frequency based telecommunication system for short range communication which effects local network access for capacity demanding broadband services in a cellular short range communication system such as, for instance, DECT.

2. Discussion of the Background

Presently, DECT (Digital European Cordless Telecommunications) offers cost efficient local access telephony (e.g., voice) and data communications, where the data communications is not greater than 500 kbit/s. On the other hand, due to capacity limitations, DECT cannot offer broadband services such as, for instance, video-on-demand to a large number of users.

LMDS (Local Multi Point Distribution Services) is another present system that cost efficiently offers distribution of video. LMDS is colloquially known as "wireless cable-TV" and is allocated to frequency bands with a very high capacity, namely, 27.5–29.5 GHz and 40.5–42.5 GHz under the designation MVDS. As recognized by the present inventor, a limitation with LMDS is that it is presently implemented with analog signals and is in its present commercial form does not support Media Access Control (MAC) protocol (or medium access control) for handling of trunked two-way communication. LMDS, however, as anticipated by the present inventor, will in the United States, and probably also in Europe, offer two-way services such as telephony, data and video-on-demand, so development of MAC-protocols and digitization of LMDS will be of great commercial importance. While such development may be going on today in the United States, significant hurdles exist that must be overcome in order to provide profitable systems and to adapt to European standards and conditions.

A problem with existing DECT-systems, as recognized by the present inventor, is that DECT-systems can only transmit narrowband to medium band information, but not necessarily "broadband" information, such as would be needed to support video services.

Presently known systems and publications offer no solutions to the above mentioned problem. For example, example patent documents which have issued in the LMDS-field describe only how to make one-way video distribution possible, but fail to describe MAC-protocols and two-way broadband communication. While prototype high capacity point-to-multipoint systems exist, these prototype systems so far have considerably lower downlink capacity than that which the present inventor has determined is commercially important. Further, common baseband and RF-technologies are utilized in uplink and downlink which implies experimental prototype systems are not exploring the possible benefits associated with using "hybrid" systems.

SUMMARY OF THE INVENTION

The present invention has been made in consideration of such problems, and accordingly it is an object of the present invention to provide a novel method, device and system that solves the above-identified problems and limitations with present DECT and LMDS systems.

Another object of the present invention is to effect an extended DECT-system which can transmit and receive both narrowband, medium band and capacity demanding broadband information, such as for instance video information.

These and other objects are obtained with a device, a method and a radio frequency (RF) based telecommunication system for short range communication which effects local network access for broadband services in a cellular short range system. The present invention integrates two separate cellular systems for short range communication into a hybrid system. The hybrid system includes one subsystem that is digital (e.g., DECT), allocated to lower frequency bands and intended for local two-way communication wireless coverage and public switch telephone network (PSTN) access, as well as access to other information networks. The other subsystem (e.g., LMDS) is allocated to higher and broader frequency bands and wholly or partly intended for capacity demanding broadband communication. By employing a digital media access control (MAC) protocol for the other subsystem, DECT-based broadband communications is possible by including the DECT-based communications within subbands of frequencies allocated for the other subsystem (e.g., LMDS system).

By following the above-described system architecture, subcomponents of the present invention, as will be discussed, effectively combine a traditionally asymmetric broadband subsystem (e.g., LMDS) with a traditionally narrowband symmetric system so as to produce a hybrid mobile communication system of the DECT-type that also accommodates broadband services.

Consequently, the present invention enables via DECT access transmission of multiple of services at the same time, such as for instance speech, picture, video, to a household.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
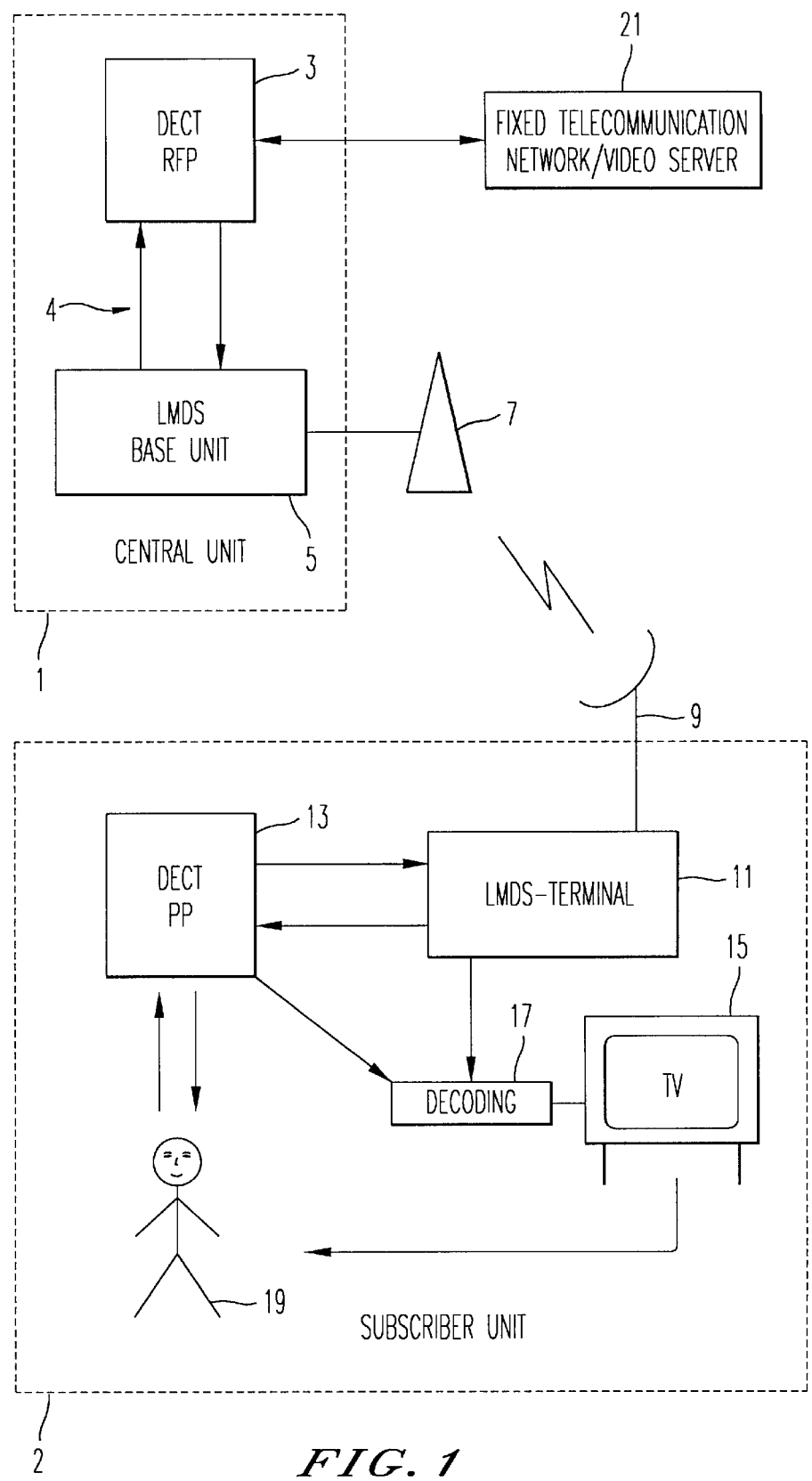
FIG. 1 is a block diagram of a hybrid system according to an embodiment of the present invention.

Referring now to the drawings, wherein like reference numerals designate identical or corresponding parts throughout the several views, and more particularly to FIG. 1 thereof there is illustrated a hybrid broadband communication system according to the present invention. The hybrid system is based on an integration of two different communications systems for short range communication, i.e. DECT and LMDS. One of the communication systems is a cellular short range system, which in the description is exemplified with DECT, and is characterized in that it is digital, allocated to a lower frequency bands (0.5–6 GHz) and intended to provide surface coverage via symmetric two-way communication (symmetric regarding capacity in up- and downlink). The other cellular short range system, which in the description is exemplified with LMDS, is characterized in that it is allocated to higher and broader frequency bands (primarily the 28 GHz and/or 40 GHz MVDS-bands) and wholly or partly intended for broadband transmission in the downlink, for instance video distribution. This LMDS component of the present inventive hybrid system is asymmetric in that distribution of multiple broadband components (e.g., plural video programs) occupies more bandwidth than does the request signals for requesting access to selected of the multiple broadband components. However, an alternative feature of the present invention, as will become clear, is that by using selected portions of the LMDS frequency band, digital broadband communications may affected in an uplink as well as a downlink.

In FIG. 1, three major components of the hybrid system include a central unit 1, a subscriber unit 2, and a fixed telecommunication network/video server 21. The central unit 1 includes a DECT RFP 3 which is "fixed part" corresponding to the central unit, which in the preferred embodiment is also fixed. The DECT RFP 3 connects to a fixed telecommunication network/video server 21 which provides access to conventional public switched telephone network (PSTN), integrated service digital network (ISDN), and video services (e.g., video telephony services, which require considerable more bandwidth than conventional voice communications). The fixed telecommunication network/video server 21 is connected to the DECT RFP 3 in the central unit 1 by conventional land lines including twisted pair, coaxial cable and optical fiber connections. Alternatively, a wireless connection may be used.

The DECT RFP 3 connects to the LMDS base unit 5 via a high capacity bus 4 which exchanges control and data between the two units. In particular, when the DECT RFP 3 requests that certain information be sent through the LMDS base unit in a LMDS channel (e.g., subband), the DECT RFP 3 will issue a request signal to the LMDS base unit 5. When the LMDS base unit 5 acknowledges the request signal, the DECT RFP sends with the narrowband, medium band, or broadband data, an indication as to the capacity allocation required by the DECT RFP for this particular communication to a destination subscriber unit 2. The LMDS base unit 2, then allocates a portion of its frequency band for sending this communication to the subscriber unit 2 so that the narrowband, medium band or broadband information will be sent to the subscriber. Both the DECT RFP 3 and LMDS base unit 5 include a microprocessor and appropriate software for handling the control message exchange and include semiconductor memory (RAM and ROM) for holding control messages, subscriber addresses, and for buffering data. The LMDS base unit 5, as will be discussed, translates DECT "downlink" data (i.e., signals from the central unit 1 to the subscriber unit 2) into an appropriate LMDS channel in the LMDS band. Alternatively, the LMDS base unit 5 translates only broadband DECT requests to the LMDS band, and sends other DECT signals via conventional DECT transmission equipment.

The LMDS base unit 5 connects to a base station transmit antenna system 7, which is configured to accept downlink signals in the LMDS band, amplify the same and transmit the amplified downlink signals to the subscriber unit 2. The antenna system 7 includes a low gain broadcast antenna so as to give omnidirectional coverage, or pseudo-omnidirectional coverage.

The subscriber unit 2 includes a receive antenna 9, which is a parabolic dish antenna, although horns, and other directive antennas may be used as well. The antenna 9 is pointed at the antenna system 7 so that a maximum signal flux will be captured by the antenna 9. The antenna 9 provides the coupled downlink signal to a LMDS-terminal 11 which receives the respective channels in the LMDS band and identifies particular channels as carrying DECT signals (based on earlier coordination messages exchanged with the central unit 1).

The LMDS terminal 11 includes a microprocessor which is configured to respond to particular control messages sent from the LMDS base unit 5 indicating which of the LMDS channels include DECT information and to which subscriber unit 2, the signals should be directed. The microprocessor in the LMDS-terminal 11 directs that the channels containing the DECT information be directed to a DECT portable part (PP) 13. Other LMDS channels are directed to a decoding device 17, which decode the broadband signals for display on a televison monitor 15. The DECT PP 13 also includes a microprocessor which responds to control messages in the respective DECT messages sent to the DECT PP 13 from the LMDS terminal 11, where the control messages indicate the nature and format (e.g., narrowband voice, medium band stereo, and broadband video) of the information to be received. Selected broadband signals that contain encoded video signals may also be sent to the decoding device 17 for subsequent display on the TV 15. An operator 19 of the subscription unit 2 may then observe video signals from the TV 15 or receive data or voice signals as decoded and supplied by the DECT PP 13.

The configuration shown in FIG. 1 is also used to provide narrowband, medium band or broadband signals from the subscriber unit 2 to the central unit 1 (and perhaps the fixed telecommunication network/video server 21) in an inverse fashion. The subscriber provides the information to the DECT PP 13, which in turn temporarily buffers the information in memory and produces an up-link allocation request message to the LMDS-terminal 11. In response, if an LMDS channel is available for DECT service (as is determined by requesting the same from the LMDS base unit 5 via, for example an orderwire channel or dedicated narrowband channel), the information buffered in the DECT PP 13 is passed to the LMDS terminal 11, which then translates the information into the allocated LMDS channel and transmits the information via the antenna 9 to the antenna system 7. The antenna system 7 then provides this DECT information to the LMDS base unit 5, which recognizes the DECT information and informs that DECT RFP 3 that DECT information is available for processing. Subsequently, the DECT RFP 3 receives the DECT information and routes it via the Fixed telecommunication network/video server 21 accordingly.

The integration is in substance made by a combination of DECT and LMDS so that LMDS radio transmission between the DECT-PP 13 the and DECT-FP occurs via the up-link and via the downlink. Furthermore, the sub band allocation for DECT usage in the LMDS frequency band permits the use of narrow, mid, or broadband usage on the LMDS downlink and on uplink (by using one of the LMDS channels traditionally used for downlink, but instead using it for an uplink). In an alternative embodiment another subsystem with considerably lower frequency band than the LMDS-downlink is used for transmission of a DECT-uplink (i.e. from PP to RFP). In this case, transmission of broadband information in downlink, for instance video channels is possible without disturbing the system capacity of the LMDS allocation.

According to the above system, in addition to broadband services which occupy, for example, one LMDS channel, DECT, may be used to carry speech (for instance adaptive differential pulse code modulated, ADPCM, 32 kbit/s), narrow and medium band data communication, for instance 32 kbit/s, 64 kbit/s, 144 kbit/s, 500 kbit/s and ISDN. These narrow and medium band data services are used in the same way as the different profiles in the DECT-standard prescribes, but with integration into the LMDS. In that way considerably broader frequency bands and more channels are available for digital DECT than conventional DECT systems.

According to the above, higher capacity even with cells of the size of 5 km cell radius may be achieved as compared with conventional DECT systems. For example, DECT systems nominally use 10 carriers, but according to the present invention (via the use of "extended carriers"), DECT-equipment with 30 carriers, for example, can be used according to the present invention in order to further increase the capacity of DECT. The additional carriers are available by virtue of allocating specific partial LMDS bands to DECT use.

Based on the digital and two-way communications characteristics of the DECT aspect of the present invention, authorization/encryption information may be relayed to the subscriber unit 2 so that only authorized persons can use the information which is transmitted via DECT and LMDS, for instance pay services such as video-on-demand, consistent with Media Access Control (MAC) for LMDS. As will be discussed in more detail, local terminal mobility of the subscriber unit (or portions thereof) may be accomplished through the use of one or more DECT repeaters.

Figure 2:
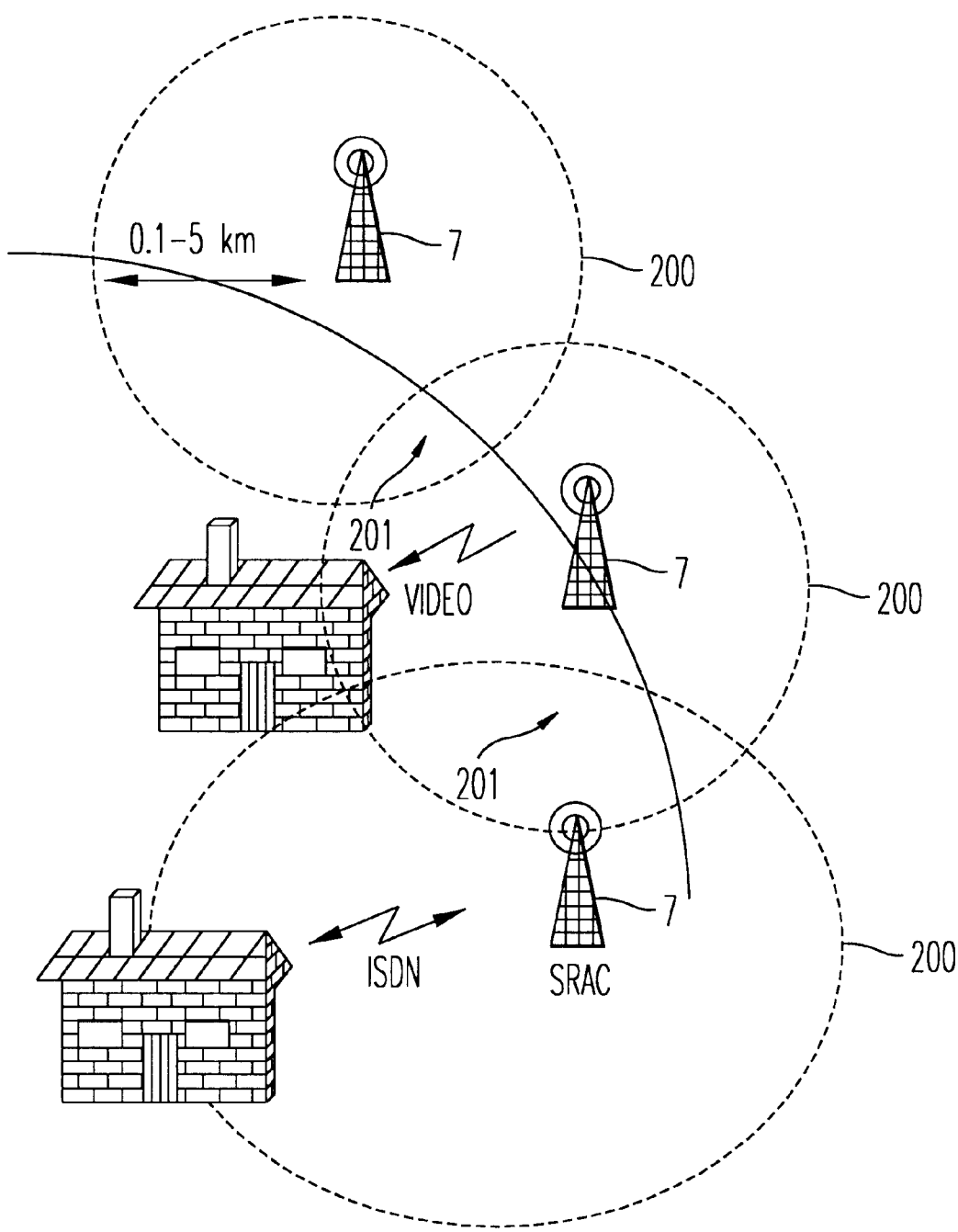
FIG. 2 is a schematic illustration showing respective cell sizes and corresponding coverage areas for asymmetric (for example) short range RF communications according to the present invention.

FIG. 2 shows typical cell sizes for asymmetric short range communication systems (0.1–5 km). The present invention is also characterized in that the cells can to a great extent overlap in surface coverage 201, so that a large number of the subscriber units 2 can be reached by more than one central unit 1 (employing omnidirectional antenna systems or plural antennas covering differing geographical sectors) and a single subscriber unit 2 (employing a spatial diverse antenna system 9) can receive signals from multiple central units. In that way installation of the subscriber antenna 9 is facilitated and a larger accessibility is attained due to diversity reception possibilities as well as receiving distinctly different signals from respective central units (i.e., viewing each central unit as a separate "gateway"). Further, the asymmetric short range communication system is characterized in high directivity for subscriber antennas and low directivity for central unit antennas. In that way the uplink can be regarded as a point-to-point connection, at which the uplink has a larger number of alternative frequency bands that do not interfere with, perhaps, competing subscriber units located in geographically distinct sectors. So as to accentuate this feature, the central unit 1 may employ several directional receive antennas each serving geographically distinct sectors.

Figure 3:
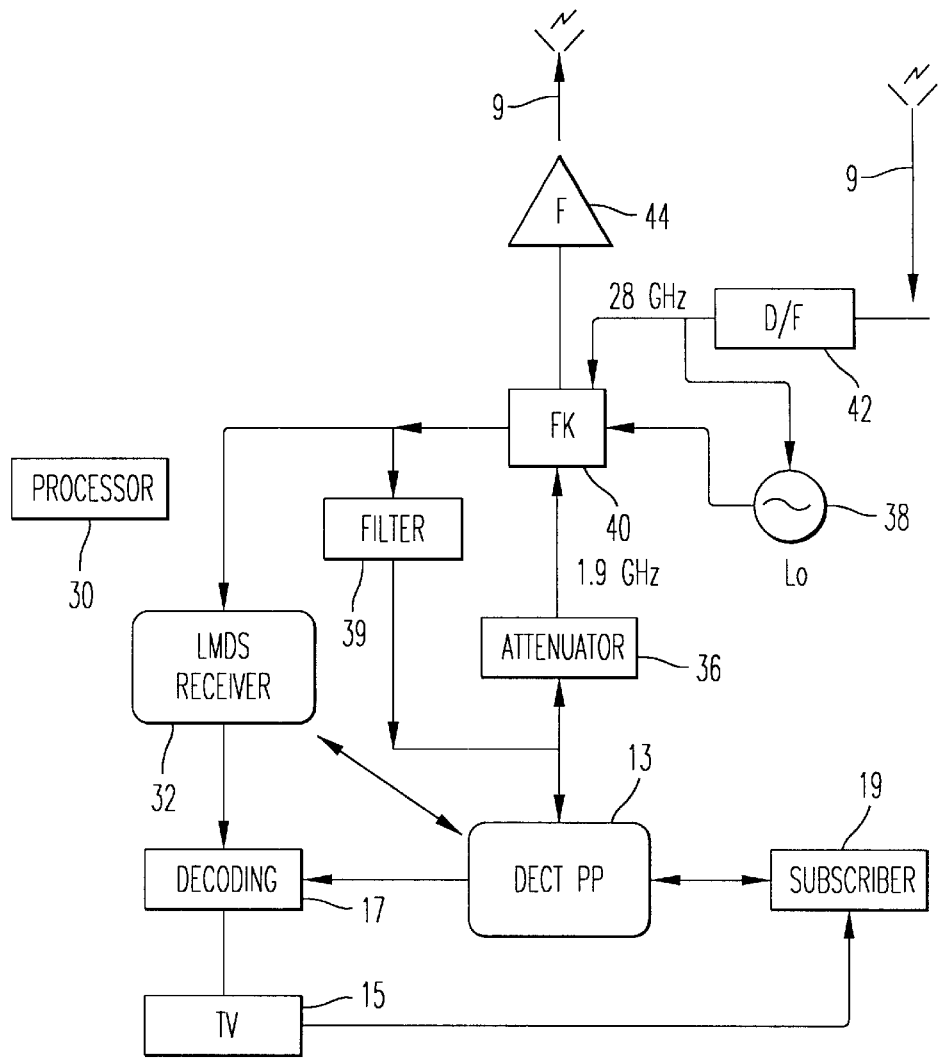
FIG. 3 is a block diagram of a subscriber unit which integrates an LMDS portion and a DECT portion for operation in the hybrid system according to the present invention.

FIG. 3 describes a subscriber unit 2 according to the present invention. It should be noted that a part of the received signal in the subscriber unit 2 is used to control a local oscillator "Lo", 38. Furthermore, the antenna "9" is configured to operate in transmit and receive configurations as exemplified by the respective directional arrows (arrow pointing down referring to downlink, and arrow pointing up referring to uplink). Also, a processor 30 is shown as being present and configured to receive and dispatch control instructions and data via a bus, not shown but understood to interconnect the components of the subscriber unit 2.

Regarding the uplink for a DECT signal, an output signal from the DECT-PP is produced in the DECT RF-band (for instance 20 MHZ in the 1.88–1.9 GHz band). The output signal is attenuated, if necessary, by a controllable attenuator 36 (such as a remotely controllable resistive pad) and the attenuated output signal is converted in frequency via the frequency converter 40 to the LMDS-band. The attenuation is made in order to give correct input level to the frequency converter (FK) device 40.

Figure 4:
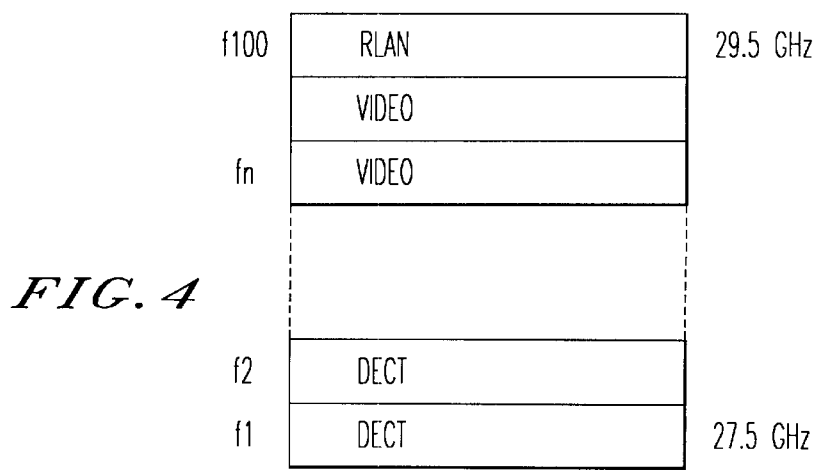
FIG. 4 is frequency band diagram of a protocol structure according to the present invention where DECT bands are allocated to particular parts of a traditional LMDS frequency band.

The local oscillator frequency "Lo" is also controllable, by the processor 30 for example, such that the output frequency is made to be in the wanted partial LMDS band (see also FIG. 4).

The output signal from the frequency converter 40, which output signal is now in the assigned LMDS band, is amplified by the amplifier (F) 44, and transmitted to the central unit 1 (FIG. 1) via the transmit portion of the antenna 9, which has a high directivity.

The transmit portion of the antenna 9 cooperates with a receiver portion of the antenna 9. Alternatively a separate antenna is used for reception.

On the downlink, a received signal is attenuated or amplified by the level control circuit D/F 42 so that a correct input level is attained is applied to the frequency converter (FK) 40.

The frequency converter 40 converts the received RF signals to intermediate frequency (IF) signals (alternatively baseband signals). The output of the frequency converter 40 is passed to a LMDS receiver 32, which responds to the LMDS signals contained therein (usually video signals). However, the output of the frequency converter 40 is also applied to a filter 34 which excludes the LMDS signals contained in spatially distinct bands from DECT traffic signals which are passed to the DECT-PP.

Alternatively, if DECT is replaced by for instance Global System for Mobile communications (GSM), or another system which utilizes frequency duplex instead of time duplex, a duplex filter should be connected between filter 34, attenuator 36 and DECT-PP 13.

FIG. 4 shows the different partial LMDS-bands allocated in 20 MHZ portions, each of which corresponds to DECT's normal system bandwidth (as compared with DECT channel bandwidth). In the 2 GHz span shown in FIG. 4, 20 MHZ are allocated into 100 partial channels. The first two channels are shown as being statically allocated as "f1" and "f2" for DECT use. Likewise the channels fn to f99 are shown to be allocated to video use, and the f100 partial band is allocated for "RLAN" functions which include control and coordination features. Because, in one embodiment, the subscriber unit 2 and the central unit 1 coordinate between one another on dynamically allocating the partial LMDS bands for different uses, the DECT aspect of the present hybrid system includes cases where multiple partial LMDS-bands are allocated for DECT use. In that way for instance a very high telephony capacity can be achieved or broadband digital data transfer can be achieved. The allocation to different partial LMDS-bands can be fixed for a certain subscriber (for instance by a certain LO-frequency). It should however be noted that the LO-frequency should be adjustable with regard to reference signal or message from the DECT-RFP 3 based on demand requests. To this end an expensive, exact oscillator should not be needed in the subscriber unit 2 when the LO 38 is desirably held to a fixed (static) output.

Alternatively, the partial band allocation can be made dynamic by the central unit 2 controlling which partial band the subscriber shall utilize. For example, as discussed above, the reference signal or the message from DECT-RFP can be used to control the frequency of the local oscillator in the terminal. Dynamic control of the local oscillator however implies that a common LO according to FIG. 3 should not be used, but rather a controllable LO oscillator that operates under control of the processor 30, for example.

Already today there exist commercial LMDS-units at low costs. Among other things there are receiver antennas with built-in frequency conversion from the LMDS-band to the 1–2 GHz-band (the IF-band for satellite receivers, and within the DECT RF band). Consequently, in light of the present teachings, it is relatively straight forward to realize DECT-reception by means of LMDS at a low cost, and therefore can be interesting to realize a somewhat modified integration of LMDS and DECT for the uplink.

Figure 5:
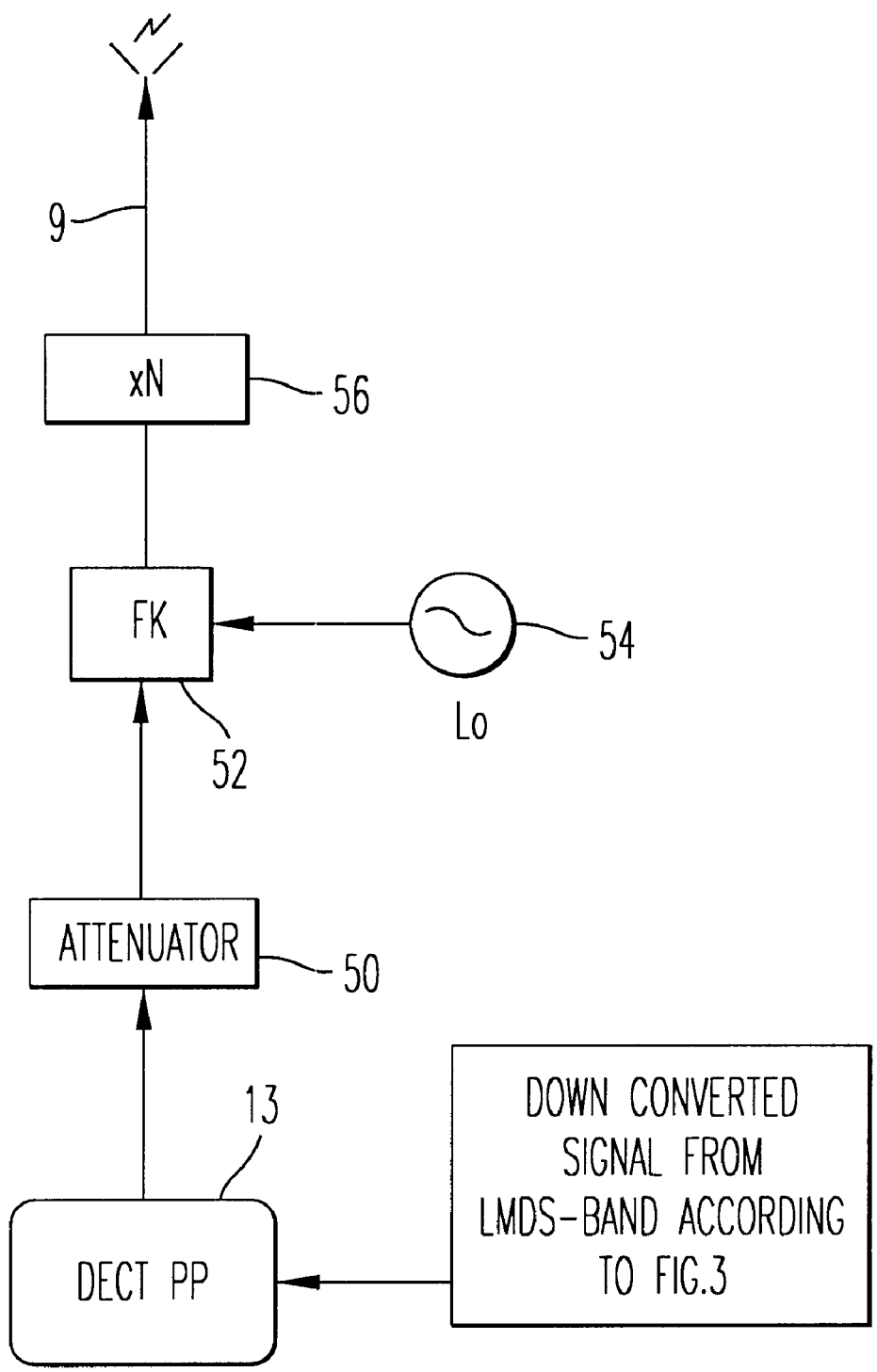
FIG. 5 shows an alternative embodiment of a subscriber unit which on an uplink integrates aspects of a LMDS system and a DECT system.

An alternative embodiment of the integrated hybrid system of the present invention, and in particular an uplink therefor, is described with reference to FIG. 5. An output signal from the DECT-PP 13 is provided in the DECT's RF-band (for instance 1.88–1.9 GHz), and is attenuated with an attenuator 50 so as to produce a correct input level signal (typically 10 dBm, max.). The attenuated signal is then converted with a frequency converter 52, as fed from a controllable local oscillator Lo 54 to a frequency which is a whole multiple (e.g., 1/N, being a multiple fraction) of a desired partial LMDS-band (see FIG. 4). The local oscillator's 54 frequency is set by a controller (not shown), or alternatively fixed to one of several levels, so that the frequency conversion is made to the whole multiple of a desired partial band. The signal is then connected to a multiplier 56 which the output signal from which is connected to the antenna 9. Filters to suppress intermodulation distortion (IMD) products may be added if necessary.

Suppose the multiplier is set to N=3, the LO is sent to F=9 GHz and the DECT RF frequency is set to 1.9 GHz. Consequently, the output of the multiplier 56 places the DECT RF signal energy in a partial LMDS-band at 28.9 GHz (i.e., 3×9 +1.9). The advantage is that one can select a low LO-frequency compared with FIG. 3 and consequently higher frequency stability can be realized at low cost. Furthermore, no amplifier is needed, because the multiplier 56 is configured to output an RF signal a level of 18 dBm as is made possible by modern gallium arsenide (GaAs) field effect transistor (FET) technology . Such multipliers already exist commercially, and 18 dBm provides sufficient output power to close the uplink in the suggested cell structures as shown in FIG. 2.

With respect to the components of the central unit 1, the DECT RFP 3 and the LMDS base unit 4 generally contain the same RF circuitry, albeit the central unit 1 is configured to cover a region and not merely a sector, and coordination of LMDS partial bands is coordinated by a processor in the LMDS base unit 5. Furthermore, a processor in the DECT RFP 3 (as is the processor 30 in the DECT PP) is configured coordinate requests for partial LMDS channel allocation, where the requests for the DECT RFP 3 occur from the fixed telecommunication network/video server 21 and the requests for the DECT PP 13 come from the subscriber 19.

As previously discussed, the present invention is particularly well suited for providing video-on-demand services and an example of such an application is provided below.

a. The subscriber 19 makes a call to the central unit 1 via the DECT PP 13 and the LMDS terminal 11 in one of the LMDS partial bands allocated for DECT use (see FIG. 4).

b. The subscriber 19 requests the service from the LMDS base unit 5, which conveys the request to the DECT RFP 3.

c. In the request, the subscriber 19 selects a particular film (e.g., video signal) by, for instance, indicating in the request message a code/designation which is be shown on the TV 15 in a separate non-encrypted menu channel via LMDS.

d. The DECT RFP 3 (alternately the LMDS base unit 5) in the central unit 1 checks the subscriber authorization (e.g., a code stored in the DECT PP which is transmitted with the request message) and asks for confirmation of film selection from the subscriber 19 via a confirmation message sent from the central unit 1 to the subscriber unit 2.

e. The subscriber 19 confirms the film selection.

f. In response, the central unit 1 transmits a code key (so called "tag") and channel information via DECT (i.e., one of the DECT allocated LMDS partial channels) to the subscriber. The "tag" is an indication having sufficient information for selection and use of a decoding key for decoding at subscriber unit 2. The channel information refers to information about which LMDS-channel that shall be used in downlink for distribution of the film. By the key being transmitted via DECT, security is achieved in that the authorization and subscription etc. of the subscriber can be checked, thereby avoiding a risk of piracy of programming information. Further, information which is transmitted over DECT can be fully or partially encrypted for further protection.

g. The DECT-PP 13 transmits the key and the channel information to the decoding unit 17 and the LMDS-terminal 11 for decoding of respective channel selection. Transmission to the decoding device 17 from the DECT-PP 13 can be made via a fixed data connection, e.g., a connection to a PCMCIA-card in the decoding device 17.

h. The film is retrieved from the fixed telecommunication network/video server 21 and transmitted after first being encoded via the LMDS base unit 5. The code can be changed at certain intervals during any given film. In this case, a new code key is transmitted to the authorized subscriber 19 via DECT.

i. The subscriber can stop the film show whenever he/she wants via a stop request sent from the DECT PP 13 to the DECT RFP 3.

Figure 6:
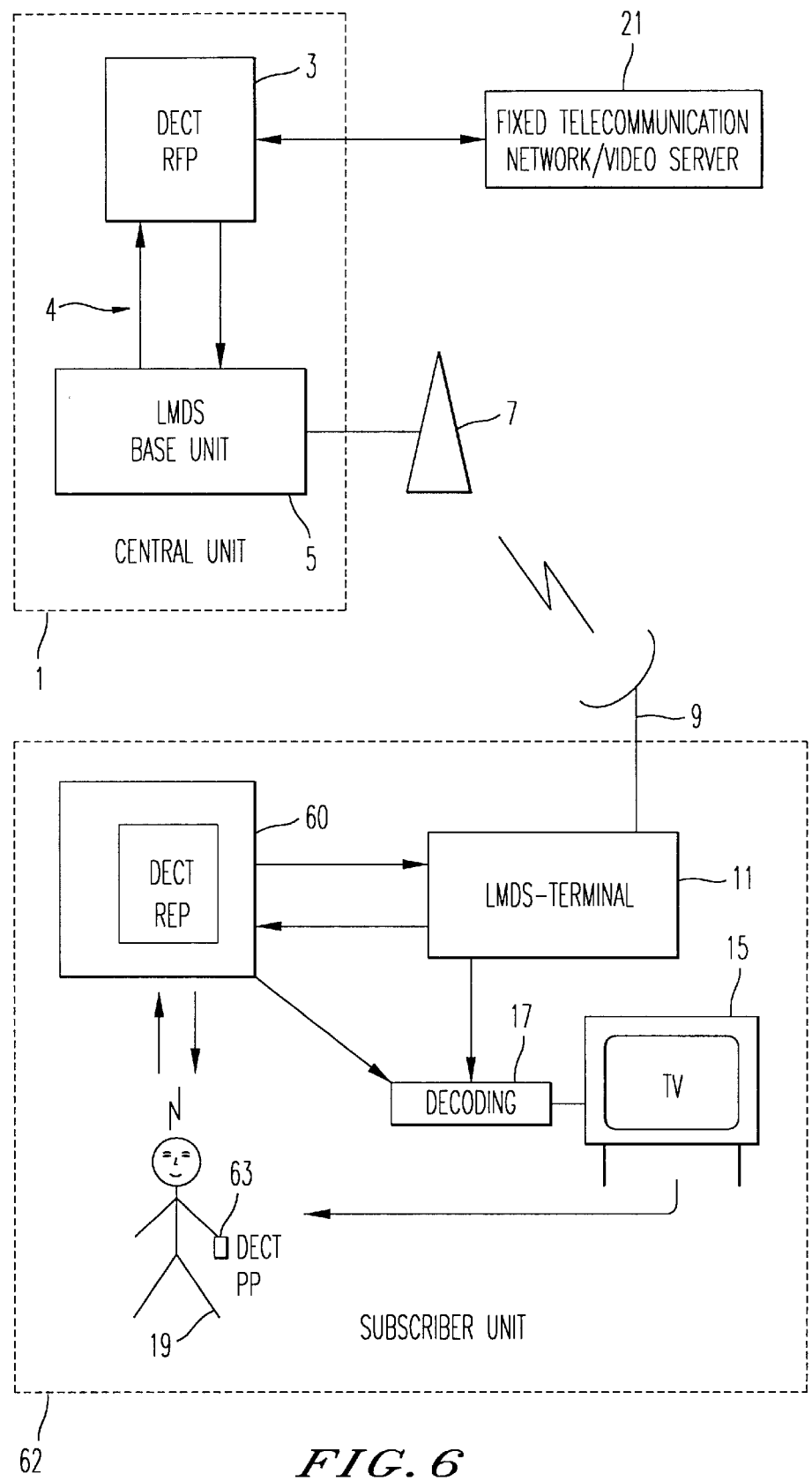
FIG. 6 is a block diagram of a hybrid system according to another embodiment of the present invention which includes a repeater.

FIG. 6 describes an alternate embodiment of the present invention which includes the integration of one or more DECT-repeaters 60 between the DECT PP 13 and LMDS terminal 11. A detailed description of the repeaters is provided in (1) co-pending U.S. patent application Ser. No. 08/747,991, filed Nov. 12, 1996, the contents of which is incorporated herein by reference, (2) Swedish patent document 9203723-3, December 1992, the contents of which is incorporated herein by reference, and (3) Swedish patent document 9402028-6, the contents of which is incorporated herein by reference.

A structure for this repeater corresponds with a simplified variant of a base station and includes a receiver and transmitter that is capable of performing a repeating function. The repeater is equipped to operate in accordance with the time-division multiple access (TDMA) and time division duplex (TDD) protocol. The repeater differs from a base station in that connections to PSTN and other networks are not required, nor is hardware and related software for implementing functions such as baseband data manipulation and home location register functions. Furthermore the repeater does not necessarily (although alternatively it may) include a coding/decoding mechanism.

The allocation of time slots for repeating messages between a base station and a mobile unit is accomplished by virtue of the repeater being in contact with both the base station and the DECT-PP. Via a control channel (or alternatively, a request message or other approach), the repeater requests selected frames for repeating messages when a signal sent to/from the DECT-PP is beyond the communication range of the base station to/from the DECT-PP directly. In response the base station allocates a frame for the repeat operation and informs the repeater of the same, thus describing how and when the repeater is activated. A drawback of the repeating function is that division of a TDMA time frame into units in which two of the units are dedicated for communicating to a repeater, is approximately one half as efficient of a system that does not dedicate portions of a TDMA frame to a repeater.

A description of the embodiment in FIG. 6 includes the repeater 60 which serves as a local wireless communications link from the components of the subscriber unit 62 to a portable DECT PP 63. Communication between the DECT repeater 60 and the DECT RFP 3 is made on a higher frequency band than the normal DECT-band, which on the other hand is utilized for communication between the portable DECT PP 63 and the DECT communication between the portable DECT PP 63 and the DECT repeater 60. The embodiment also can include a wireless or a hard-wired connection between the decoding device 17 and the DECT repeater 60. Alternatively, a connection can be made as was previously described from the DECT PP 63.

The DECT-standard among other things includes MAC functionality, which allows, for instance, dynamic channel selection. The invention utilizes DECT/MAC for the partial LMDS-band which carry the DECT-channels. In an alternative embodiment of the present invention there is also added certain MAC-functionality for other partial LMDS-bands, i.e. for the broadband downlinks. In this embodiment, the LMDS-receiver 32 and/or decoding device 17 can decide a quality (Q) of the received signal. Q can for instance be based on signal strength measurement, bit error measurement, or in an analog embodiment, on measurement of distortion of a control tone.

Figure 7:
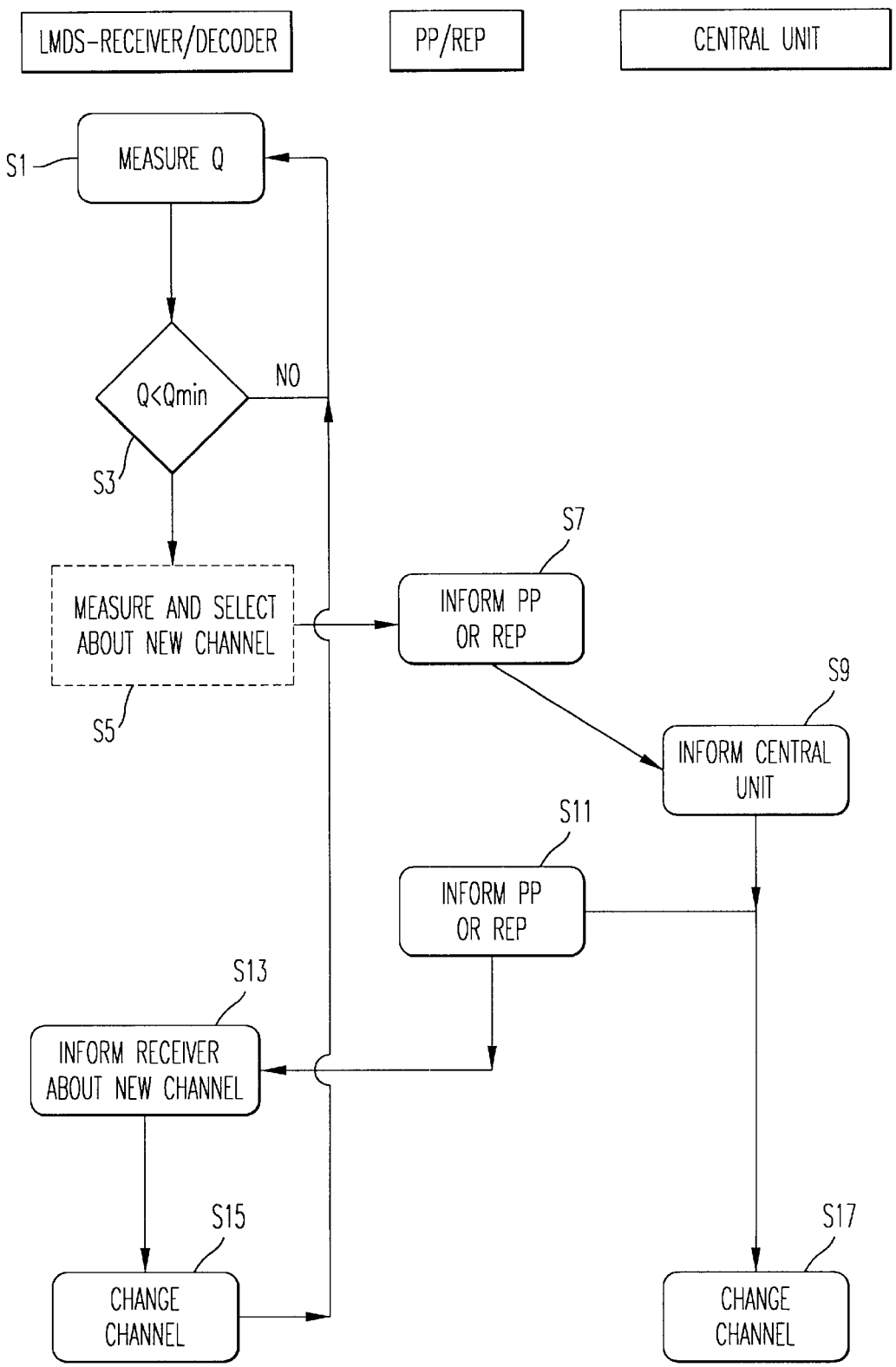
FIG. 7 shows a flowchart/MAC-message protocol diagram used for handling the broadband downlink according to the present invention.

A flowchart/signaling diagram showing the MAC/ broadband downlink with different MAC-messages is described in FIG. 7. In FIG. 7, the steps performed by the respective LMDS-receiver/decoder (32/17), PP/REP (13/ 60), and Central Unit 1, are positioned below the respective labels "LMDS-receiver/decoder", "PP/REP", and "Central Unit". While FIG. 7 shows communication of certain information, it is to be understood that further communication may be implemented, for instance, confirmation of the MAC-messages between the different units can be added. There are a number of alternatives for how the MAC-messages can be transferred, and the present disclosure does not attempt to recite each variation although these variation will be readily apparent to a skilled artisan based on the present teachings. The message in uplink includes information about channel quality (Q) and a suggestion for new channel; the message in downlink includes a decided new channel.

In FIG. 7 the process begins in step S1 where the uplink channel quality (Q) for a presently selected channel (i.e., a partial LMDS band, or a selected portion of a partial LMDS band) is measured. Based on the measurement result, the process flows to step S3, where the channel quality is compared with a minimum channel quality threshold (which is stored in memory in the LMDS-receiver/decoder). If the response to the inquiry in step S3 is negative, the process returns to step Si and the measurements of channel quality continue. However, if the response to the inquiry in step S3 are affirmative, the process flows to step S5 where the LMDS-receiver/decoder measures and identifies a better channel with a channel quality that surpasses the minimum channel quality threshold Qmin.

After a new channel has been identified, the process proceeds to step S7 where the LMDS-receiver 32, or alternatively the decoding device 17, informs, via a control message, the DECT PP 13 or repeater 60 of the recommended new channel. Subsequently, the process flows to step S9 where the central unit S1 is informed, via a control message, of the recommended new uplink channel request. Then, in step S17, the central unit 1 changes the channel (alternatively, changes the channel after a predetermined delay so that the subscriber unit 2 will have first been informed of the channel change). In parallel with step S17, after step S9, the process proceeds to step S11, where the central unit 1, reallocates and informs the DECT PP 13 or repeater 60 of the new assigned channel, and the LMDS receiver 32 and decoding device 17 are informed about the new channel in step S13. Consequently in step S15, the LMDS receiver/decoder changes the channel to correspond with the channel change made by the central unit 1 in step S17. After step S15, the process returns to step S1, where the new channel is monitored for sufficient channel quality.

Consistent with the description as set forth in FIG. 7, the following methods of MAC message transmission have been identified: transmission between LMDS-receiver/decoder and central unit can be made in form of:

data messages over DECT, including one of DECT's standardized profiles for data;

transmission by a data modem via DECT's speech channel, where the central unit 1 can be regarded as a subscriber within DECT-FP at which "intercall" can be utilized; and transmission via internal DECT-message can be performed. Examples of such messages are Call Independent Supplementary Services (CISS). The standard includes a number of CISS-messages. For the application in question, however, a new type of CISS-messages need to be defined which contains information according to the teachings above.

Consistent with the above teachings is that wireless DECT-communication is made on a high frequency band.

At initiation of a new broadband downlink connection, the corresponding method can be used. When requesting the service, information about channel status can be transmitted from the subscriber unit 2 to the central unit 1 via the DECT, so that transmission can start on an undisturbed channel.

As has previously been mentioned, LMDS is provided with a MAC-protocol and certain digitization by combining LMDS with DECT. Inversely one can say that LMDS is utilized to make DECT-based broadband communication possible.

The present invention also can in an alternative embodiment cost efficiently provide a digital LMDS/HPMP-system with MAC protocol and telephone services. This can be especially interesting because potential HPMP-manufacturers in most cases have their background from point-to-point applications, that is the reason for that they HPMP-manufacturers (for instance Bosch ATN) have not yet developed/implemented MAC protocols to manage surface covering truncated two-way communication.

The present invention also, as has been mentioned above, makes possibility for use of DECT-repeaters in capacity demanding environments and applications. As discussed in the patent documents of the present assignee, Telia AB holds a number of patent documents that teach the use of repeaters for DECT (e.g., co-pending U.S. patent application Ser. No. 08/747,991, and Swedish patent documents 9402028-6, 9203723-3, among others). As identified by the present inventor, repeaters are expected to become of great importance for DECT and are also described by the DECT-standard. However, the capacity of DECT can be somewhat reduced through the use of repeaters, but the present invention solves this problem by the increased channel capacity offered by the present inventive hybrid DECT/LMDS system.

The present invention makes possible that one already in the short run can realize transmission of broadband/multimedia services (telephony, video-on-demand, interactive TV, ISDN, data communication 32- 00 kbit/s) in the connection network at a low cost. It should be noted that the subsystems which are utilized in the present invention even today can be obtained at a very low cost.

Because the present invention utilizes wireless technology, new connection networks can be realized very quickly, compared with wire-based technology which require significant resources in order to establish the hardwired infrastructure. Commercial users therefore can utilize the present invention as an important complement/alternative to optical fibers, coaxial cables, and asymmetric digital subscriber line (ADSL/HDSL), for example, so as to gain time and save expenses for home use. New carriers may use the teachings of the present invention as a strategic network component so as to more effectively compete with established carriers and local operators.

Complete standards for surface covering broadband access or interactive LMDS/MVDS systems do not exist today. Standardization will be started late 1997 within ETSI TM4. Descriptions for video distribution via LMDS and MVDS are at present produced within DVB (the work group for Digital Video Broadcasting). This work has not yet dealt with interactivity. The present invention therefore may become of importance for these works within DVB respective ETSI.

The invention also can be used in applications for DECT-repeaters to increase the capacity and unload the normal DECT-band.

The teachings of the present invention have been proven effective and verified by theoretical analysis. LMDS as a subsystem for video distribution has been verified by tests in the USA. The Federal Communications Commission (FCC), has taken a positive attitude to the results of the tests. The system is planned to be tested under Swedish conditions in an LMDS-project. Bearing in mind that Sweden in general has less precipitation than in the test regions of the USA, implementation of the present invention in countries such as Sweden do not pose significant implementation problems. Sometimes time dispersion due to horizontal multipath propagation between buildings, mountains etc is stated as a threat against DECT's radio performances, but in the present invention, the subscriber terminal 2 utilizes a directional antenna 9 with a very narrow main lobe (about 1–3°) which will efficiently suppress possible multipath effects. Further, the present invention is intended to be utilized for the coverage (<5 km) which can be handled by DECT's radio protocol with regard to propagation delay. Also it should be emphasized that the short coverage efficiently excludes disturbances caused by atmospheric multipath propagation; problems which normally make radio link systems considerably more expensive at high frequencies. According to studies within current project (e.g., LMDS++), exactly this design criterion is the determining factor to make it possible to establish surface covering broadband access at a low cost. As an example, if the system would be required to function at a range of 15 km, necessary output power would have to be increased 100–1000 times for maintained accessibility at atmospherical multipath propagation. Such an increase of the output power is with today's micro- and millimeter wave technology impossible to realize at "consumer cost".

The integration of DECT with LMDS, as discussed herein, is not expected to subject to any great problems, although the two-way communication aspect of the present invention creates the possibility of intermodulation distortion (IMD). However, IMD is not unique to the present invention and is applicable to all systems which are based on frequency duplex. IMD has been successfully mitigated for instance with effective spectral filters and these mitigation techniques may be employed herein as well.

This invention may be conveniently implemented using a conventional general purpose digital computer, or related digital and RF signal processing boards programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United State is:

1. A radio-based two way short range communication device that provides local network access for broadband services, comprising:

a first cellular system configured to operate in a first frequency range and provide capacity-demanding broadband services having a predetermined bandwidth; and a second cellular system which when operated individually communicates digital signals between respective terminals at frequencies lower than said first frequency range of said first cellular system and occupying another bandwidth that is narrower than said predetermined bandwidth of said first cellular system, said second cellular system being integrated with said first cellular system such that when said second cellular system is operated jointly with said first cellular system, said digital signals are two-way communicated in a portion of said predetermined bandwidth in said first frequency range of said first cellular system.

2. The device according to claim 1, wherein:

said first cellular system comprises a LMDS system; and said second cellular system comprises a DECT-system.

3. The device according to claim 2, wherein said frequencies lower than said first frequency range comprise at least one of a complete fraction and a multiple of a partial LMDS-band in said first frequency range, said partial LMDS-band having a 20 MHZ bandwidth which corresponds to a normal bandwidth of DECT signals in said DECT-system.

4. The device according to claim 2, further comprising:
a DECT repeater configured to relay signals to and from a DECT-PP in capacity demanding environments, and provide communication to a DECT-RFP in a control unit at a higher frequency band than said frequencies lower than said first frequency range.

5. The device according to claim 2, wherein said LMDS system comprises a MAC-protocol mechanism for two-way communicating said broadband services and digitizing said LMDS system by incorporating said DECT system with the LMDS system to effect DECT-based broadband communication.

6. The device according to claim 5, wherein said MAC-protocol mechanism uses a MAC-protocol for providing said broadband services in a downlink and providing MAC-messages in an uplink, said MAC-messages in said uplink including a channel quality indicator and another indicator that suggest a new channel having a channel quality that surpasses a predetermined threshold, one of said MAC-messages in the downlink including a decided new channel indicator.

7. The device according to claim 5, wherein;
said DECT system comprises a DECT-PP at a subscriber unit and a DECT-RFP at a control unit, said DECT system configured to transmit digital information via radio transmission in an uplink from said DECT-PP to said DECT RFP, and configured to transmit broadband information in a downlink from said DECT-RFP to said DECT-PP, at least one of said uplink and said downlink carrying transmission of speech, narrow and medium band data information, and ISDN compatible data;
said DECT system comprising an authorization/encryption mechanism that uses authorization/encryption information transmitted in said downlink so that only an authorized subscriber can use the information which is transmitted via said system DECT and said LMDS system;
said LMDS system configured to use a Media Access Control protocol; and
said DECT system further comprising a repeater, said repeater configured to provide connectivity between said DECT-PP, which is configured to operate as a mobile unit, and other components of said DECT system.

8. The device according to claim 7, wherein said subscriber unit comprises:
an attenuator that attenuates an output signal in said second frequency range;
a frequency converter that transforms said output signal after being attenuated to said first frequency range, said frequency converter comprising a local oscillator configured to produce a LO signal that causes said frequency converter to transform said output signal into at least one of any partial LMDS-band;
an amplifier that amplifies said output signal after being transformed by said frequency converter;
an antenna subsystem comprising at least one of a directive transmit antenna, a directive receive antenna, and a directive transceive antenna, said antenna subsystem configured to transmit said output signal, said antenna subsystem also configured to receive a received signal;
a signal level adjustment mechanism configured to adjust a level of said received signal to within a predetermined range, said signal level adjustment mechanism configured to provide said received signal, after adjustment, to said frequency convertor which converts DECT designated signals to said frequencies lower than said first frequency range and provides portions of said received signal, after adjustment, to a LMDS-receiver; and
a filter that removes non DECT designated signals from said received signal prior to providing said DECT designated signals to said DECT-PP.

9. The device according to claim 8, wherein said at least one directive transmit antenna, said directive receive antenna, and said directive transceive antenna comprise a directional antenna having a main beam in a range of 1–3° so as to suppress multipath effects.

10. The device according to claim 7, wherein said subscriber unit comprises:
a frequency converter that transforms an uplink signal to a frequency which is at least one of a whole multiple and a complete fraction of a frequency of a selected partial LMDS-band;
a local oscillator connected to said frequency converter and configured to provide to said frequency converter a LO signal;
a multiplier that multiplies said uplink signal at said selected partial LMDS band by a factor N and outputs a multiplied output signal; and
an antenna with high directivity that transmits said multiplied output signal.

11. The device according to claim 10, wherein said antenna comprises a directional antenna having a main beam in the range of 1–3° so as to suppress multipath effects.

12. A method for providing local network access to broadband services in a radio based short range telecommunication system, comprising the steps of:
integrating a first cellular system with a second cellular system, comprising,
operating said first cellular system in a first frequency range that is wholly or partly intended for capacity demanding broadband communications having a predetermined bandwidth,
providing capacity demanding broadband services in said first cellular system, and
allocating in said second cellular system a lower frequency band than said first frequency range and narrower in bandwidth than said predetermined bandwidth of said first cellular system for surface coverage two-way communication with digital signals; and
communicating said digital signals of said second communication system in said predetermined bandwidth in said first frequency range.

13. The method according to claim 12, wherein said integrating step comprises integrating a LMDS-system as said first cellular system with a DECT-system as said second cellular system.

14. The method according to claim 13, wherein:
said step of operating comprises the steps of,
using a MAC-protocol in said LMDS-system, and
digitizing selected messages communicated in said LMDS-system by employing a DECT format therein; and said step of communicating comprises effecting DECT-based broadband communication by transmitting said digital signals in a portion of said first frequency range allocated to said LMDS-system.

15. The method according to claim 14, wherein said integration step comprises the steps of:
   using the LMDS-system for radio transmission between a DECT-PP and a DECT-RFP via an uplink and a downlink;
   transmitting broadband information in said downlink, said information comprising at least one of a speech signal, a narrow band data communication signal, a medium band data communication signal, and authorization/encryption information used for Media Access Control for LMDS; and
   using DECT-repeaters so as to enable local terminal mobility of said DECT-PP.

16. The method according to claim 15, wherein said transmitting step comprises transmitting said broadband information for said DECT-system in at least of a complete fraction and a multiple of one of a plurality of 20 MHZ partial LMDS-bands, each of which correspond to a normal DECT-system bandwidth.

17. The method according to claim 16, for executing a multimedia service, comprising the steps of:
   calling by a subscriber to a central unit using a DECT message format;
   requesting by the subscriber the multimedia service;
   selecting by the subscriber a service alternative including a code/designation which is shown in a special non-encrypted menu channel via LMDS;
   checking at the central unit for whether the subscriber is authorized, and if so, requesting the subscriber to confirm the service alternative previously designated;
   confirming by the subscriber the service alternative;
   transmitting at the central unit a code key and a channel information via DECT to the subscriber;
   forwarding at the DECT-PP the key and the channel information to a decoder and a LMDS-terminal for decoding a respective channel selection;
   transmitting the service alternative in a coded form via LMDS where a code used to encode the service alternative is changeable at certain intervals; and
   cutting-off by the subscriber the service alternative by dispatching a control command via DECT.

18. The system according to claim 17, wherein at least one of said first cell and said second cell comprises two distinct cellular systems for short range communication, a first one of said two distinct cellular systems configured to transmit and receive digital signals in a first frequency band, and a second one of said two distinct cellular systems having a second frequency band that is higher in frequency and broader in range than said first frequency band, said second frequency band being wholly or partly intended for capacity demanding broadband communication.

19. The system according to claim 18, wherein said first one of first cellular short range systems comprises a DECT-system, and the other cellular short range system comprises a LMDS-system.

20. A radio-based two way short range communication device that provides local network access for broadband services, comprising:
   a first cellular system configured to operate in a first frequency range and provide capacity-demanding broadband services in a predetermined bandwidth;
   a second cellular system which when operated individually communicates digital signals between respective terminals at frequencies lower than said first frequency range of said first cellular system and in a bandwidth that is narrower than said predetermined bandwidth;
   means for integrating said first cellular system with said second cellular system, comprising,
      means for operating said first cellular system in the predetermined bandwidth of said first frequency range that is wholly or partly intended for capacity demanding broadband communications,
      means for providing capacity demanding broadband services in said first cellular system, and
      means for allocating in said second cellular system a lower frequency band than said first frequency range for surface coverage two-way communication with digital signals; and
   means for communicating said digital signals of said second communication system in said first frequency range.

* * * * *